US010757473B2

United States Patent
Roujansky (10) Patent No.: US 10,757,473 B2
(45) Date of Patent: Aug. 25, 2020

(54) DIGITAL MEDIA SPLICING SYSTEM AND METHOD

(71) Applicant: STARFISH TECHNOLOGIES LTD, Reading Berkshire (GB)

(72) Inventor: Michel Roujansky, Saint-Georges sur Loire (FR)

(73) Assignee: STARFISH TECHNOLOGIES LTD., Reading, Berkshire (GB)

( * ) Notice: Subject to any disclaimer, the term of this patent is extended or adjusted under 35 U.S.C. 154(b) by 0 days.

(21) Appl. No.: 15/766,562

(22) PCT Filed: Oct. 3, 2016

(86) PCT No.: PCT/EP2016/073537
§ 371 (c)(1),
(2) Date: Apr. 6, 2018

(87) PCT Pub. No.: WO2017/060182
PCT Pub. Date: Apr. 13, 2017

(65) Prior Publication Data
US 2018/0295415 A1 Oct. 11, 2018

(30) Foreign Application Priority Data
Oct. 8, 2015 (GB) .................................. 1517809.8

(51) Int. Cl.
*H04N 7/12* (2006.01)
*H04N 21/44* (2011.01)
(Continued)

(52) U.S. Cl.
CPC ..... *H04N 21/44016* (2013.01); *H04N 19/177* (2014.11); *H04N 21/23424* (2013.01); *H04N 21/8547* (2013.01)

(58) Field of Classification Search
CPC .......... H04N 21/44016; H04N 19/177; H04N 21/23424; H04N 21/8547
See application file for complete search history.

(56) References Cited

U.S. PATENT DOCUMENTS 6,611,624 B1 * 8/2003 Zhang .............. H04N 21/23406
370/498
7,574,102 B2 8/2009 Declan et al.
(Continued)

FOREIGN PATENT DOCUMENTS

| EP | 0837609 A2 | 4/1998 |
| GB | 2353655 A | 2/2001 |
| WO | 2002/100110 A2 | 5/2002 |

OTHER PUBLICATIONS

International Search Report and Written Opinion, dated Nov. 30, 2016. International Application No. PCT/EP2016/073537.
(Continued)

*Primary Examiner* — Peet Dhillon
(74) *Attorney, Agent, or Firm* — Maschoff Brennan (57) ABSTRACT

The present invention relates to a system and method of inserting a secondary stream of digital frames into a primary stream of digital frames without transcoding any of the streams, where the primary stream is encoded according to a first format and the secondary stream is encoded according to a second format where each frame is independent of a succeeding frame. The approach comprises receiving a requested splice-out point in the primary stream; determining an optimal splice-out point in the primary stream in dependence upon the requested splice-out point; receiving a requested splice-in point in the primary stream; determining an optimal splice-in point in the primary stream in dependence upon the requested splice-out point; and replacing the section of the primary stream between the optimal splice-out point and the optimal splice-in point with the secondary stream.

29 Claims, 4 Drawing Sheets

(51) Int. Cl.
*H04N 21/234* (2011.01)
*H04N 19/177* (2014.01)
*H04N 21/8547* (2011.01)

(56) References Cited

U.S. PATENT DOCUMENTS

| | | | |
|---|---|---|---|
| 8,863,182 B1 | 10/2014 | Sharifi et al. | |
| 2002/0041628 A1 | 4/2002 | Andersson et al. | |
| 2002/0057739 A1* | 5/2002 | Hasebe | H04N 19/40 375/240.01 |
| 2002/0172281 A1 | 11/2002 | Mantchala et al. | |
| 2008/0317246 A1* | 12/2008 | Manders | H04N 5/783 380/37 |
| 2009/0003432 A1* | 1/2009 | Liu | H04N 21/4344 375/240.01 |
| 2009/0010329 A1* | 1/2009 | Hora | G11B 20/10 375/240.12 |
| 2012/0047282 A1* | 2/2012 | Mehta | H04N 21/23424 709/231 |

OTHER PUBLICATIONS

Search Report dated Feb. 24, 2016, issued in GB application No. GB 1517809.8 (7 pages).

\* cited by examiner

DIGITAL MEDIA SPLICING SYSTEM AND METHOD

FIELD OF THE INVENTION

The present invention relates to a system and method for inserting digital media into a main digital media stream. More particularly, but not exclusively, the present invention relates to a system and method for splicing at least two compressed digital streams, particularly video and/or audio streams, to form a single compressed digital stream without transcoding any of the digital streams.

BACKGROUND

The process of splicing two analogue signals is relatively simple, as you simply find a vertical interval, and execute a switch between the two signals. This is a simple technique where the signals are synchronous and time-aligned.

For base-band digital signals, each frame is discrete, and so these signals can be readily spliced. However digital signals are not typically transmitted in base-band form, but instead encoded into a more efficient form, such as by using MPEG-2 or MPEG-4 which employ inter-frame coding.

MPEG (Moving Picture Experts Group) is a working group that sets standards for audio and video compression and transmission. Digital video compression is a process that, for example, removes redundancy in the digital video pictures. The redundancy between pictures in a video sequence can amount to a spatial redundancy and/or a temporal redundancy. MPEG coding, and particularly the more recent coding standards, starting with MPEG-2 compression, takes advantage of these redundancies by efficient coding. Accordingly the resulting representation is smaller in size that the original uncompressed pictures. MPEG encoding is highly statistical in nature, and lossy, as it essentially throws away content that is unlikely to be missed.

Digital stream insertion is essentially a process where a part of a primary digitally compressed stream is replaced by another secondary compressed stream. A particular application of this process is with programmes for transmission or broadcast, which have been compressed at a first location (e.g. by the programme maker) and then sent to a second location (e.g. a transmission facility for a local community). It may be desirable for those at the second location to insert information, such as advertisements, that are specific or relevant to their local community (i.e. locally targeted advertising or other regionally specific content). This is not a function that the programme distributor is typically willing to perform on another's behalf, particularly when they are distributing the programme around a multitude of different transmission facilities, each with their preferred local content for insertion.

Where the programme is being streamed in real-time, or substantially real time, to local transmission facilities, it would also be desirable for the local transmission facilities to be able to insert a secondary advertisement stream into the live network feed. Of course this is not a simple matter when that live network feed is compressed.

It is to be appreciated that the technique of "insertion" is equivalent to "splicing". That is, it refers to the process whereby a transition is made from a primary stream to one or more secondary streams, and then, typically, back to the primary stream.

The simplest way to splice television programmes is in the baseband signal before compression occurs. This technique works well when the programme streams are received at the cable head-end in uncompressed form. However, when the programme is distributed in the form of an MPEG transport stream, to do so would require the stream to be fully decompressed and then recompressed with the inserted clips, which is a costly proposition, particularly in terms of quality, time and required processing power.

Where the signals or streams are compressed, the splicing process is complex, as not only are packets/frames in MPEG streams dependent upon adjacent packets in the stream, but MPEG coding schemes also utilise variable length encoding of digital video pictures. These factors all need to be considered when decoding MPEG streams.

More specifically, MPEG compression utilises a number of different frame/picture types, I-, P- and B-frames, which serve different purposes. These different frame types have different numbers of bytes and as a result, different transmission times. More particularly:

I-frames, or Intra-frames, can be fully decoded without reference to (and/or independently of) any other frames. That is, they are encoded using only information present in the picture itself;

P-frames, or Predicted-frames, are used to improve compression by exploiting the temporal redundancy in a scene. P-frames store only the difference in image from the frame immediately preceding them. The immediately preceding frame is therefore a point of reference; and B-frames, or Bidirectional-frames, like P-frames are also used to improve compression, although this time by making predictions using both the previous and sequential frames (i.e. two anchor frames, namely I- and/or P-frames). Accordingly, in order to decode a B-frame, the decoder must process the previous frame and the sequential frame first, which means decoding B-frames requires large data buffers.

These frames are grouped into sequences, in MPEG coding. In MPEG-1 and MPEG-2 they are known as a "Group of Pictures" (GOP) whilst in MPEG-4/H.264 and HEVC/H.265 they are called a "Coded Video Sequence" (CVS). Henceforth, the term GOP will be used to describe such a sequence of frames of any of these formats, or similar formats. Such GOP sequences typically contain a combination of all of these frame types. Because of the dependency of P- and B-frames on anchor frames, it is not possible to cut one stream on a B-frame and enter the next on a P-frame because the anchor frames would no longer be correct.

The prior art addresses this problem by re-coding a section of a stream after an MPEG coded stream is received and processed by a decoder. For example, a sequence of B-frames in an incoming stream may be re-coded to I-frames or P-frames which are not dependent on subsequent frames. In this way, the re-coded digital stream would allow another digital stream to interrupt the original encoding interrelationship and at the same time permit frames around the splice point being decoded cleanly. However, this requires a decoder with additional processing units having large computational power which can be costly and complex.

A further problem in splicing two digitally encoded streams is resolving timing differences between the two streams. Since each stream is typically independent of each other, each stream would contain its own timing information which would be specific to the stream itself. Therefore, upon splicing the two streams, the timing information would become inaccurate (i.e. it would create a discontinuity in the time base).

There is therefore a need to overcome or improve at least one problem of the prior art.

In particular there is a need for an improved system and method for enabling insertion of video and/or audio clips into an MPEG transport stream.

SUMMARY OF THE INVENTION

According to a first aspect, the present invention provides a method as defined in claim 1.

Other aspects of the invention are defined in the attached claims.

Advantageously, the present invention enables one or more clips of a secondary stream to be inserted into a primary (or main broadcast programme) stream without the need to decompress/recompress (transcode) the inserted secondary stream or any part of the primary stream.

In the embodiment, the insertion of a secondary stream in a primary stream is executed at an optimal splice-out point in dependence upon a requested splice-out point. The optimal splice-out point is determined in dependence upon a frame in the primary stream which is independent of a succeeding frame (an I-frame or a P-frame).

An advantageous format for the secondary stream is an I- and P-frame only format. Whilst a combination of I- and P-frames have a larger file format than other compressed frame formats, by having the secondary stream in a format that is not dependent upon subsequent packets, the clips can readily be inserted into a primary stream and further allows the frames of the inserted clip to be transmitted in display order and decoded whatever the point at which insertion stops.

The advantage of using P-frames is that they offer a higher compression ratio than I-frames alone. Therefore, the quality of the video is higher when using frame sequences that are encoded with I-frames and P-frames as opposed to I-frames alone.

A particular advantage of these aspects of the invention is that they enable the secondary stream to be spliced into a primary stream at an insertion point (optimal splice-out) that is ideally decided by the entity performing the insertion without having to transcode any of the streams.

BRIEF DESCRIPTION OF THE DRAWINGS

The embodiments of the invention will now be described in more detail with reference to the accompanying Figures, in which.

DETAILED DESCRIPTION

The MPEG-2 standards define how to format the various component parts of a multimedia programme (which may consist of: MPEG compressed video, compressed audio, control data and/or user data). It also defines how these components are combined into a single synchronous transmission bit stream.

MPEG transport stream is specified in MPEG-2 and is a standard format for transmission and storage of data including audio, video, Programme and System Information Protocol (PSIP) data and combinations thereof. It specifies a container format encapsulating packetized elementary streams, with error correction and stream synchronisation features for maintaining transmission integrity when the signal is degraded.

MPEG-2 transport streams are typically used in broadcast systems such as DVB, ATSC and IPTV. However, it is not exclusively used in broadcasting, as it has been adapted for use by digital video cameras, recorders and the like. Therefore the following description, although having particular application to a broadcast system is not to be considered as limited to this field.

To encode/multiplex a multimedia stream, it is first broken down into its component parts, being streams of video, audio, subtitles, control data etc. Each of these streams is known as an "Elementary Stream" in MPEG. To compress these elementary streams, each are input to an MPEG-2 processor which accumulates the data into a stream of Packetised Elementary Stream (PES) packets. The PES packets may be of a fixed or variable size. Each PES packet includes a header which typically includes a Presentation Time Stamp (PTS) and possibly a Decode Time Stamp (DTS). These time stamps are used to synchronise the elementary streams and control the rate at which each are replayed by the receiver.

The MPEG-2 standard allows two forms of multiplexing, being MPEG Programme Stream multiplexing and MPEG Transport Stream (MPEG-TS) multiplexing.

The embodiments of the present invention have particular application to the MPEG Transport Stream multiplexing, where each PES packet is broken into fixed sized transport packets, enabling one or more streams to be combined.

Packets in the MPEG Transport Stream include a header containing a Packet Identifier (PID). Each packet is associated with a PES through the setting of the PID value. The MPEG-TS is not time division multiplexed, and so packets with any PID may be inserted into the TS at any time. If no packets are available, the multiplexor inserts null packets to retain the specified Transport Stream bit rate. The multiplexor also does not synchronise PES packets, so the encoding and decoding delay for each is typically different. A separate process is therefore required to synchronise the streams.

The primary stream (often described as the "from-stream" or an "incoming stream") is preferably encoded at a constant bit-rate with a minimum of 5% null packets. These null packets allow some flexibility in the positioning of packets during replacement of the original material and insertion of the clip material.

In the present embodiment, the optimal splice-out point in the primary stream is dependent upon on a requested insertion point (requested splice-out point) selected by the party/entity inserting the clip. The optimal splice-out point is dependent upon an I-frame or P-frame of the primary stream.

When the primary stream is encoded using a closed GOP structure, the optimal splice-out point may be at the boundary of two GOP.

Figure 1:
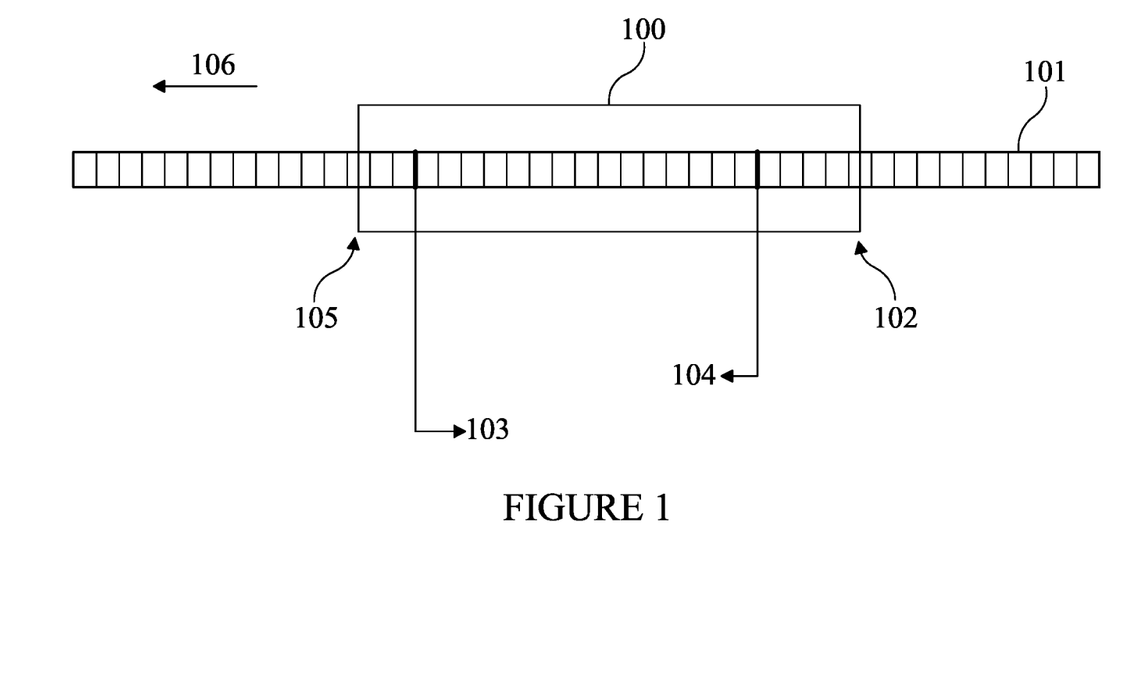
FIG. 1 illustrates GOP detection according to an embodiment of the invention.

As illustrated in FIG. 1, the incoming primary stream (101) is fed through a delay buffer (100) in a splicer (not shown) that monitors the primary stream. 106 shows the flow of the incoming primary stream.

As the primary stream passes through the delay buffer, GOP boundaries are detected at 102. Within the delay buffer, two GOP boundaries are illustrated (103 & 104). A closed GOP structure requires the first frame of each GOP to be an I-frame and the last frame of each GOP to be a P-frame as each frame of one GOP is independent of any frame from another GOP.

Upon receiving a requested insertion point, the splicer determines the GOP boundary at which the insertion will begin (optimal splice-out point).

At the processing point (105) of the delay buffer, either the GOP boundary closest to the requested insertion point or the GOP boundary immediately following the requested insertion point will be selected as the optimal splice-out point by the splicer.

When a GOP boundary of the primary stream is selected as the optimal splice-out point, the insertion of the secondary stream replaces the first (I-frame) and subsequent frames of the GOP.

Alternatively, the optimal splice-out point can also be a point of the primary stream immediately before a P-frame. As I- and P-frames are independent of succeeding frames, they allow the stream to be interrupted without losing the capability to decode all frames received previously and can be used as splice-out points.

For example, taking a typical primary stream with a 3 B-frame format, a typical sequence of frames could be as follows:

Presentation order: $I_1 B_2 B_3 B_4 P_5 B_6 B_7 B_8 P_9 B_{10} B_{11} B_{12} P_{13} B_{14} B_{15} B_{16}$ Since the primary stream in this example utilises B-frames, in order to decode a B-frame the decoder must process the previous frame and the sequential frame first. This means the decoding order is not the same as the presentation order:

Decoding order: $I_1 P_5 B_2 B_3 B_4 P_9 B_6 B_7 B_8 P_{13} B_{10} B_{11} B_{12}$ ...

Given that it is possible to interrupt a stream at P-frame, using the above sequence of frames, the positions marked by an "x" indicate potential splice-out points:

Presentation order: $I_1 B_2 B_3 B_4 P_5$ x $B_6 B_7 B_8 P_9$ x $B_{10} B_{11} B_{12} P_{13}$ x $B_{14} B_{15} B_{16}$ Decoding order: $I_1 P_5 B_2 B_3 B_4$ x $P_9 B_6 B_7 B_8$ x $P_{13} B_{10} B_{11} B_{12}$ ...

Therefore, rather than starting insertion of a secondary stream at a GOP boundary, i.e. starting the insertion by replacing an I-frame, it is also possible to start insertion by replacing a P-frame of the primary stream by the I-frame of the inserted material, as shown below:

Insertion material: I P P P P P P P P P P . . .

Decoding order: $I_1 P_5 B_2 B_3 B_4$ x I P P P P P P P P P P . . .

Presentation order: $I_1 B_2 B_3 B_4 P_5$ I P P P P P P P P P P . . .

As previously mentioned, PTS and DTS time stamps are used to synchronise the streams.

On reaching an optimal splice-out point, the splicer starts inserting material from the first video frame of the secondary stream. For the other PIDs (audio, subtitles, etc.), insertion starts when the received PTS for the respective PID reaches the PTS of the splice-out frame.

As the secondary stream is inserted into the primary stream, the first frame of the secondary stream being an I-frame replaces an I- or P-frame of the primary stream, where the secondary stream in encoded with I- and P-frames only (frames that are independent of the immediately succeeding frame). Therefore, the transition between the primary stream and the secondary inserted stream can take place without any image disruptions.

In a manner similar to selecting the optimal splice-out point, a requested splicing exit point (requested splice-in point) is also selected by the party/entity inserting the clips.

Again, like the optimal splice-out point, the optimal splice-in point is dependent upon an I-frame or P-frame of the primary stream. The Splicer will analyse the requested splicing exit point in dependence upon an I- or P-frame of the primary stream, and determine the optimal splice-in point accordingly, at which point the insertion of the secondary stream will end.

During the splicing procedure, the splicer determines whether each packet of the primary stream should be passed through unchanged, which is the case for retained PIDs or PAT and PMT packets, or used as a candidate for insertion (dropped PIDs, null packets).

When packets of the secondary stream are inserted into the primary stream, the splicer adjusts the PID of the inserted packets if it has a different PID number from the packet to be replaced.

Also, in order to maintain synchronicity between the original primary stream and the inserted clips, and for the eventual decoder to make sense of the spliced stream, the Programme Clock Reference, PCR (for the PCR PID), PTS and DTS values of the inserted packets are adjusted relative to the insert start point.

In addition to adjustment of the PCR/PTS/DTS values, appropriate adjustments are also be made in the output stream to continuity counters incorporated into the packets to follow the required sequence as defined in the standards.

In the case of using GOP boundaries as the optimal splice-in/splice-out points, the material to inserted are preferably the same GOP length as the primary stream to be replaced, but this is not a requirement.

In the present invention, the length of the clip to be inserted is preferably the same as the duration between the optimal splice-out and optimal splice-in points of the primary stream. When the length of the clip to be inserted exceeds the duration between the optimal splice-out and optimal splice-in points of the primary stream, it would be beneficial for the clip to be inserted to end with a static image such that if the clip is truncated by at least the duration of one GOP length of the primary stream there will be no visible disruption at the optimal splice-in point.

This also applies to the sound levels of the clip, which for example could be constant and/or low towards the end of the clip.

After the clip is inserted, except for continuity counter adjustments, the splicer switches from splicing mode to pass-through mode from the first video packet of the first frame of the primary stream video GOP. Insertion for other PIDs is continued until the PTS for the PID in the primary stream reaches the value of the first video frame of the GOP after the splice-in point.

Additionally, to accommodate for possible rate variations in the primary stream video which results in variations in PTS-PCR differences, the splicer makes use of a look-ahead capability provided by the buffering of the incoming primary stream, by measuring the number of packets available for video insertion. Accordingly, the insertion of a secondary stream is stopped when either the insert PTS reaches the PTS value of the frame prior to the primary stream optimal splice-in point or the space available for video insertion in the primary stream does not leave enough room for the next video frame of the clip to be inserted.

Upon loading the clip to be inserted, the splicer scans the entire content of the clip and measures the space required for each video frame of the clip. Simultaneously, the splicer precisely measures the actual number of frames and the duration of each PID to be inserted.

Figure 2:
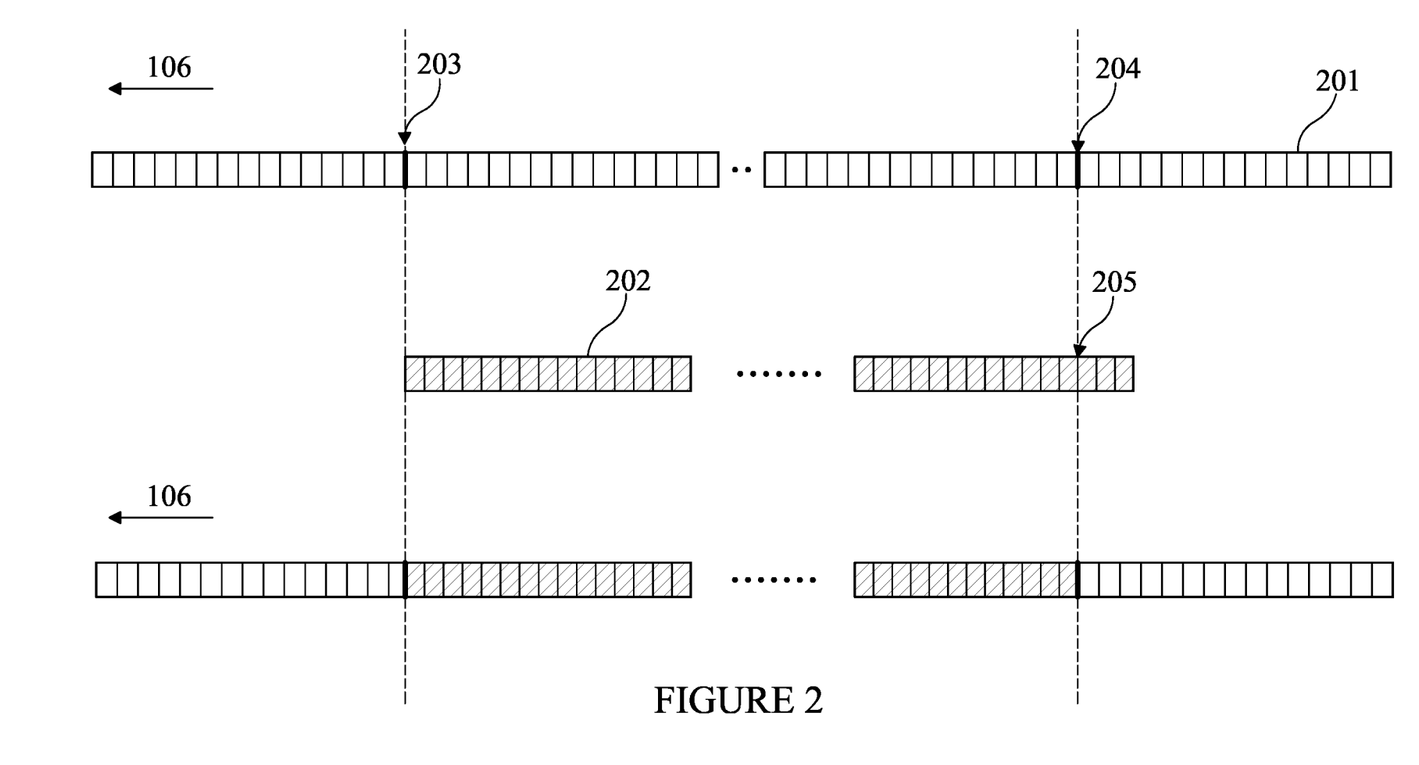
FIG. 2 provides a graphical illustration of insertion of a secondary stream according to an embodiment of the invention.

FIG. 2 illustrates the optimal splice-out point (203) of the primary stream (201), the optimal splice-in point (204) of the primary stream and secondary stream (202). As mentioned above, the secondary stream can be truncated (205) where necessary.

The present invention can also be used for implementing a broadcast blackout system, where a certain portion of an incoming primary stream is not to be transmitted for commercial, regulatory or any other reason, and is substituted by a replacement clip of a secondary stream played in a loop for the duration of the blackout period.

Figure 3:
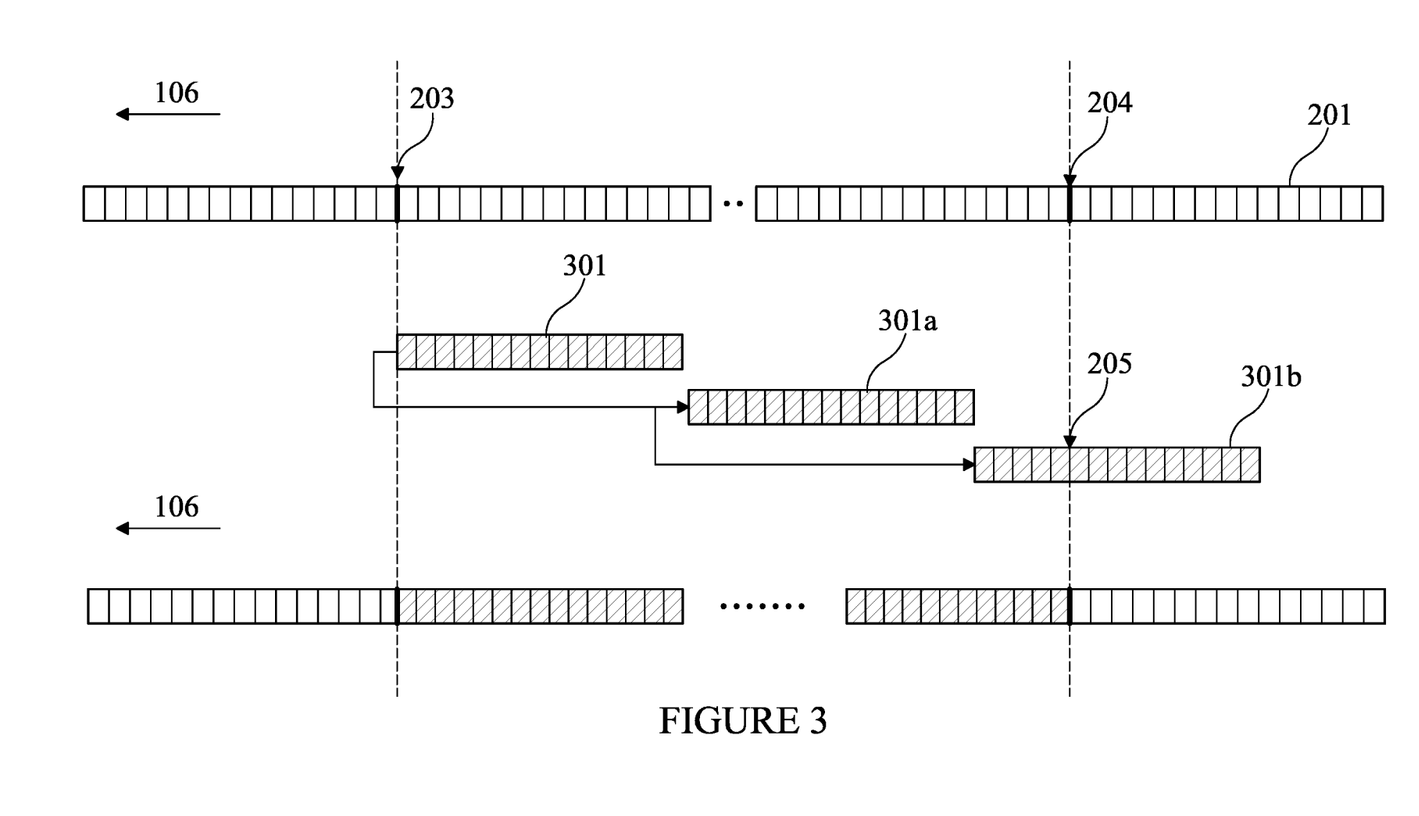
FIG. 3 illustrates a loop for reinserting a secondary stream between a splice-out and splice-in point according to an embodiment of the invention.

In this case, the splicer operates as described above, However on reaching the end of the inserted clip, it continues reading packets to be inserted by looping back to the beginning of the clip as illustrated in FIG. 3. The loop back is performed independently for each of the PIDs to be inserted upon reaching the last packet to be inserted at the end of the clip for this given PID.

On loopback, the PTS, DTS and FOR adjustments are all increased by a fixed duration which is equal to the nominal duration of the clip in order to avoid any differences between PIDs which could occur if the length of some PIDs is different from the length of the clip. Thus, in this mode, the splicer operates as though the clip to be inserted is an infinite series of concatenated copies of the single insert clip.

FIG. 3 shows the several iterations (301, 301a, 301b) of the secondary stream being inserted into the primary stream.

Figure 4:
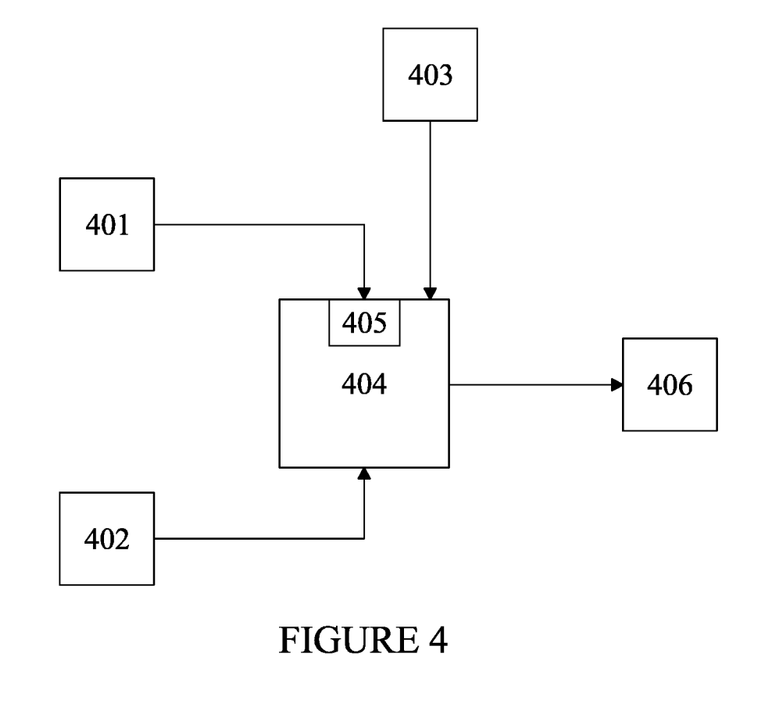
FIG. 4 illustrates a block diagram of an embodiment of the invention.

FIG. 4 illustrates a processor (404) receiving a primary stream of digital frames (401) and a secondary stream of digital frames (402). The processor further receives a requested splice-out and splice-in point for the primary stream (403). The processor includes a detection means (405) for analysing the incoming primary stream. Block 406 represents the output of the splicing procedure.

The present invention has been described as having particular application to MPEG coding schemes, such as MPEG-2 and MPEG-4 digital video compression. The present invention however may also be applied to other compression schemes such as the H.26X for video conferencing. When applying the present invention to other compression schemes, such as H.26X, the I-, P- and B-frames may be replaced with equivalents. For example, I-frames may be replaced by IDR frames when using the H.264 compression scheme.

Additionally, the present invention has been described using the term Group of Pictures, GOPs, which is a general term used to refer to a section of an encoded stream comprising more than one type of frame.

The embodiments of the invention have particular application to streams transmitted over radio frequency links (UHF/VHF). digital broadcast satellite links, cable TV networks, standard terrestrial communication links (PDH, SDH), microwave line of sight links, digital subscriber links (ADSL), packet/cell links (ATM, IP, Ethernet).

The embodiments described are to be taken as illustrative of the invention and not limitative. For instance, the order of steps is not essential to the invention and may be reordered whilst still retaining the essential functionality of the invention.

The invention claimed is:

1. A method of inserting a secondary stream of digital frames into a primary stream of digital frames without transcoding any of the streams, where the primary stream is encoded according to a first format and the secondary stream is encoded according to a second format where each frame is independent of a succeeding frame, the method including:
   receiving a requested splice-out point in the primary stream;
   determining an optimal splice-out point in the primary stream in dependence upon the requested splice-out point;
   receiving a requested splice-in point in the primary stream;
   determining an optimal splice-in point in the primary stream in dependence upon the requested splice-in point;
   replacing a section of the primary stream between the optimal splice-out point and the optimal splice-in point with the secondary stream; and
   detecting closed Group of Pictures boundaries of the primary stream;
   wherein the step of determining an optimal splice-out point in the primary stream comprises selecting a Group of Pictures boundary closest to the requested splice-out point or a Group of Pictures boundary immediately following the requested splice-out point.

2. The method of claim 1, wherein each frame of each Group of Pictures is independent of any frame from another Group of Pictures.

3. The method of claim 1, wherein the first frame of a Group of Pictures is an I-frame.

4. The method of claim 1, wherein the step of determining an optimal splice-in point in the primary stream comprises selecting a Group of Pictures boundary closest to the requested splice-in point or a Group of Pictures boundary immediately following the requested splice-in point.

5. The method of claim 1, wherein the primary stream includes timing information, and the method further includes adjusting timing information of the secondary stream to account for any differences from a section of the primary stream to be replaced.

6. The method of claim 5, wherein the first format is an MPEG transport stream and the timing information of the secondary stream adjusted includes at least one of a current Programme Clock Reference, a Decoding Time Stamp, and a Presentation Time Stamp.

7. The method of claim 1, wherein a number of available frames between the optimal splice-in point and optimal splice-out point of the primary stream is detected and the insertion of digital frames from the secondary stream into the primary stream is terminated when the available frames of the primary stream have been replaced.

8. The method of claim 1, wherein the insertion of the secondary stream comprises inserting video and audio packets into the primary stream.

9. A method of inserting a secondary stream of digital frames into a primary stream of digital frames without transcoding any of the streams, where the primary stream is encoded according to a first format and the secondary stream is encoded according to a second format where each frame is independent of a succeeding frame, the method including:
   receiving a requested splice-out point in the primary stream;
   determining an optimal splice-out point in the primary stream in dependence upon the requested splice-out point;
   receiving a requested splice-in point in the primary stream;
   determining an optimal splice-in point in the primary stream in dependence upon the requested splice-in point; and replacing a section of the primary stream between the optimal splice-out point and the optimal splice-in point with the secondary stream;

wherein the insertion of digital frames from the secondary stream into the primary stream is terminated when a Presentation Time Stamp of the inserted secondary stream reaches a Presentation Time Stamp value of a frame prior to the splice-in point of the primary stream.

10. The method of claim 9, wherein the first format comprises a closed Group of Pictures structure.

11. The method of claim 9, wherein the primary stream comprises a plurality of Group of Pictures.

12. The method of claim 9, wherein the step of determining an optimal splice-out point in the primary stream comprises selecting a splice-out point in dependence upon an I-frame or P-frame of the primary stream.

13. The method of claim 9, wherein the step of determining an optimal splice-in point in the primary stream comprises selecting a splice-in point in dependence upon an I-frame or P-frame of the primary stream.

14. The method of claim 12, wherein the optimal splice-out point in the primary stream is immediately before a P-frame of the primary stream.

15. The method of claim 9, wherein the primary stream includes timing information, and the method further includes adjusting timing information of the secondary stream to account for any differences from a section of the primary stream to be replaced.

16. The method of claim 9, wherein a number of available frames between the optimal splice-in point and optimal splice-out point of the primary stream is detected and the insertion of digital frames from the secondary stream into the primary stream is terminated when the available frames of the primary stream have been replaced.

17. The method of claim 9, wherein the insertion of the secondary stream comprises inserting video and audio packets into the primary stream.

18. A method of inserting a secondary stream of digital frames into a primary stream of digital frames without transcoding any of the streams, where the primary stream is encoded according to a first format and the secondary stream is encoded according to a second format where each frame is independent of a succeeding frame, the method including:

receiving a requested splice-out point in the primary stream;

determining an optimal splice-out point in the primary stream in dependence upon the requested splice-out point;

receiving a requested splice-in point in the primary stream;

determining an optimal splice-in point in the primary stream in dependence upon the requested splice-in point; and replacing a section of the primary stream between the optimal splice-out point and the optimal splice-in point with the secondary stream;

wherein replacing the section of the primary stream between the optimal splice-out point and the optimal splice-in point comprises inserting an infinite series of concatenated copies of the secondary stream.

19. The method of claim 18, wherein the first format comprises a closed Group of Pictures structure.

20. The method of claim 18, wherein the primary stream comprises a plurality of Group of Pictures.

21. The method of claim 18, wherein the step of determining an optimal splice-out point in the primary stream comprises selecting a splice-out point in dependence upon an I-frame or P-frame of the primary stream.

22. The method of claim 18, wherein the step of determining an optimal splice-in point in the primary stream comprises selecting a splice-in point in dependence upon an I-frame or P-frame of the primary stream.

23. The method of claim 18, wherein the primary stream includes timing information, and the method further includes adjusting timing information of the secondary stream to account for any differences from a section of the primary stream to be replaced.

24. The method of claim 18, wherein a number of available frames between the optimal splice-in point and optimal splice-out point of the primary stream is detected and the insertion of digital frames from the secondary stream into the primary stream is terminated when the available frames of the primary stream have been replaced.

25. The method of claim 18, wherein the insertion of the secondary stream comprises inserting video and audio packets into the primary stream.

26. A system for inserting a secondary stream of digital frames into a primary stream of digital frames without transcoding any of the streams, where the primary stream is encoded according to a first format and the secondary stream is encoded according to a second format where each frame is independent of a succeeding frame, the system comprises a means adapted to:

receive a requested splice-out point in the primary stream;

determine an optimal splice-out point in the primary stream in dependence upon the requested splice-out point;

receive a requested splice-in point in the primary stream;

determine an optimal splice-in point in the primary stream in dependence upon the requested splice-in point;

replace a section of the primary stream between the optimal splice-out point and the optimal splice-in point with the secondary stream; and detect closed Group of Pictures boundaries of the primary stream;

wherein the step of determining an optimal splice-out point in the primary stream comprises selecting a Group of Pictures boundary closest to the requested splice-out point or a Group of Pictures boundary immediately following the requested splice-out point.

27. The system of claim 26, wherein the step of determining an optimal splice-in point in the primary stream comprises selecting a Group of Pictures boundary closest to the requested splice-in point or a Group of Pictures boundary immediately following the requested splice-in point.

28. A system for inserting a secondary stream of digital frames into a primary stream of digital frames without transcoding any of the streams, where the primary stream is encoded according to a first format and the secondary stream is encoded according to a second format where each frame is independent of a succeeding frame, the system comprises a means adapted to:

receive a requested splice-out point in the primary stream;

determine an optimal splice-out point in the primary stream in dependence upon the requested splice-out point;

receive a requested splice-in point in the primary stream;

determine an optimal splice-in point in the primary stream in dependence upon the requested splice-in point; and replace a section of the primary stream between the optimal splice-out point and the optimal splice-in point with the secondary stream;

wherein the system further comprises means adapted so that the insertion of digital frames from the secondary stream into the primary stream is terminated when a Presentation Time Stamp of the inserted secondary stream reaches a Presentation Time Stamp value of a frame prior to the splice-in point of the primary stream.

29. A system for inserting a secondary stream of digital frames into a primary stream of digital frames without transcoding any of the streams, where the primary stream is encoded according to a first format and the secondary stream is encoded according to a second format where each frame is independent of a succeeding frame, the system comprises a means adapted to:
- receive a requested splice-out point in the primary stream;
- determine an optimal splice-out point in the primary stream in dependence upon the requested splice-out point;
- receive a requested splice-in point in the primary stream;
- determine an optimal splice-in point in the primary stream in dependence upon the requested splice-in point; and
- replace a section of the primary stream between the optimal splice-out point and the optimal splice-in point with the secondary stream;
- wherein replacing the section of the primary stream between the optimal splice-out point and the optimal splice-in point comprises inserting an infinite series of concatenated copies of the secondary stream.

* * * * *